Oct. 8, 1957  E. S. DUNN ET AL  2,809,310
SEALED ELECTRIC MOTOR
Filed Jan. 3, 1956  2 Sheets-Sheet 1

Inventors
Donald C. Haynes
Eustace S. Dunn

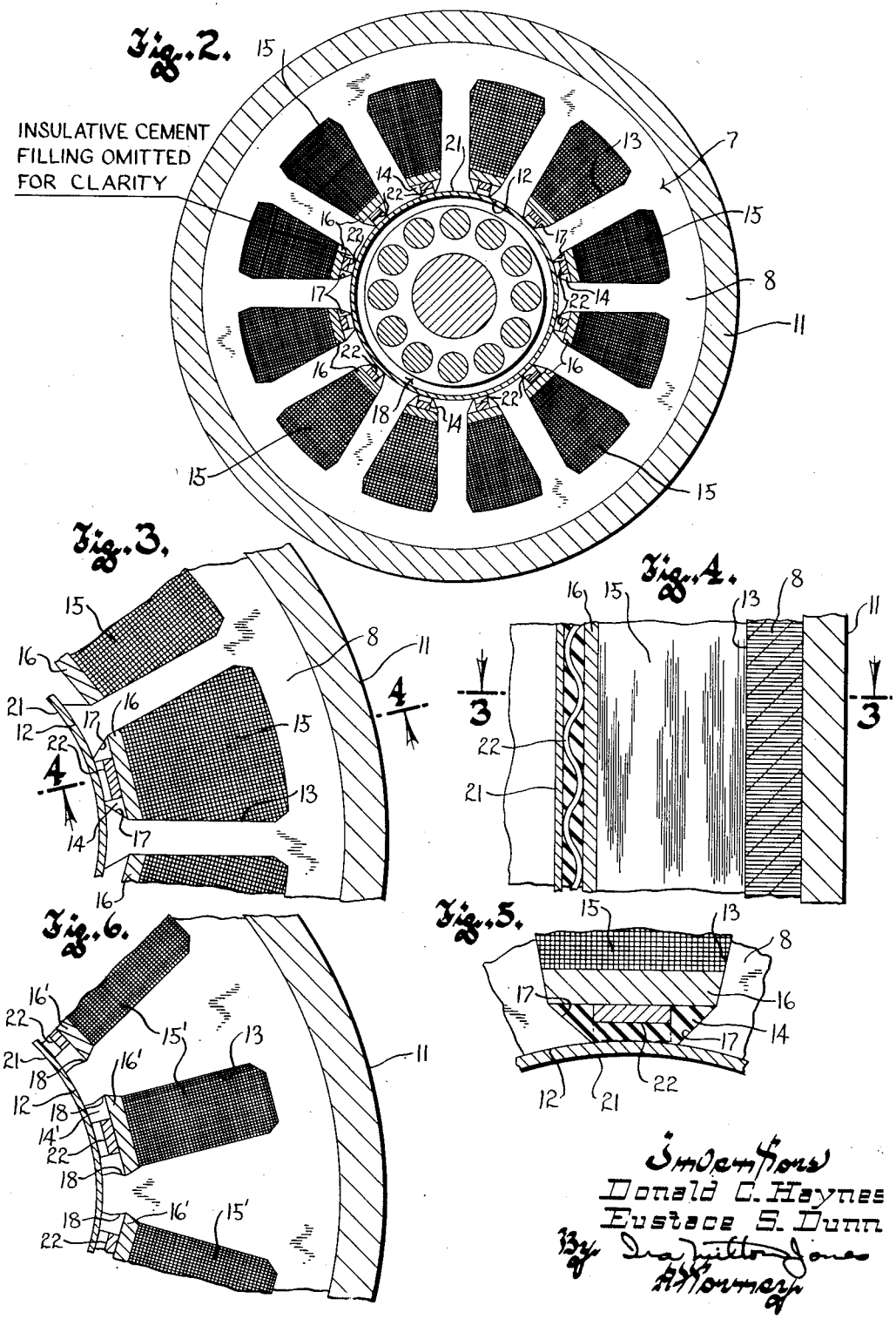

2,809,310
Patented Oct. 8, 1957

2,809,310
SEALED ELECTRIC MOTOR

Eustace S. Dunn, Piedmont, Calif., and Donald C. Haynes, Milwaukee, Wis.; said Haynes assignor to The Louis Allis Company, Milwaukee, Wis., a corporation of Wisconsin Application January 3, 1956, Serial No. 556,914

4 Claims. (Cl. 310—86)

This invention relates to electric motors of the type adapted to operate while submersed in liquid. Such motors are used for example in submersible pumps which are usually turbine pumps with a close coupled electric motor, both pump and motor being immersed in the water, oil, or other fluid to be pumped. This, of course, requires some form of protective enclosure for the motor or at least its stator. Accordingly, it is customary to enclose the stator and the stator windings of motors designed for this service, in a completely closed protective housing one wall of which is formed by a tubular sleeve lining the bore of the stator. The sleeve is of non-magnetic material, preferably having high tensile strength and high electrical resistance to reduce eddy current losses, and since the efficiency of the motor decreases with the thickness of the sleeve, it is naturally preferred to make the sleeve as thin as possible.

Reduction of the wall thickness of the sleeve however, must take into account the pressures encountered in the operation of the motor and the necessity for installing the sleeve without deformation or damage. In addition, the sleeve must be fitted into the stator bore in such a way that the sleeve will not turn under the influence of the rotating magnetic field, a hazard which is aggravated by the vibration encountered during use of the motor. Press fitting the sleeve into the stator assures against rotational creeping of the sleeve but necessitates a wall thickness for the sleeve which is disadvantageous from an electrical standpoint.

With a view toward providing a better sealed electric motor, this invention has as its object to provide a more rugged and far simpler construction than has heretofore been proposed for the securement of the lining sleeve in the stator bore, and to do so without introducing characteristics objectionable from an electrical standpoint.

Specifically, it is an object of this invention to provide a simple, positive way of keying the sleeve to the stator, which not only serves to lock the sleeve against rotation in the bore of the stator but also reinforces the thin wall of the lining sleeve at the portions thereof which span the circumferentially spaced pole tips of the stator laminations.

Another object of this invention is to provide a way of locking the lining sleeve in the stator bore which involves essentially only the securement of a plurality of reinforcing strips to the exterior of the sleeve, and wherein the strips are so constructed as to facilitate their being welded or similarly attached to the sleeve simply and inexpensively.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which:

Figure 2 is a cross sectional view through the motor taken on the plane of the line 2—2 in Figure 1;

Figure 3 is a fragmentary cross sectional view on a larger scale, through a portion of the stator, said view being taken on the plane of the line 3—3 in Figure 4;

Figure 4 is a fragmentary longitudinal section view also on an enlarged scale, taken on the plane of the line 4—4 in Figure 3;

Figure 5 is a fragmentary cross sectional detail view on a still larger scale, through a portion of the lining sleeve and the adjacent mouth portion of one of the stator slots; and Figure 6 is a fragmentary cross sectional view similar to Figure 3, but illustrating the invention adapted to a somewhat modified motor stator construction.

Figure 1:
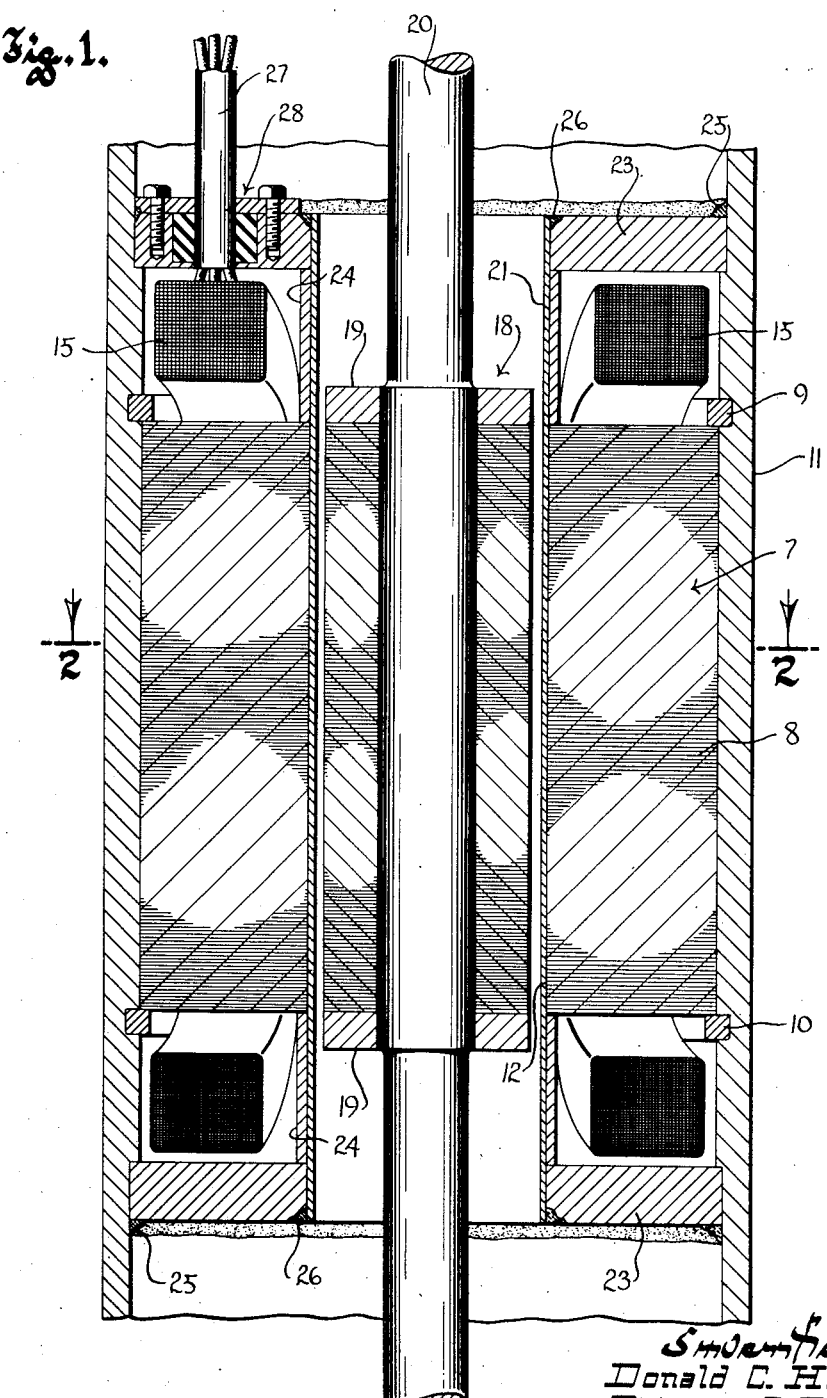
Figure 1 is a longitudinal sectional view through a sealed electric motor embodying this invention.

Referring now particularly to the accompanying drawings, the numeral 7 designates generally the stator of one type of electric motor to which this invention may be applied and which comprises a stack of laminations 8 punched from suitable metal and confined between rings 9 and 10 secured in an outer cylindrical shell or housing 11. The stator laminations 8 are provided with a bore 12 from which winding slots 13 extend radially outwardly, so that the bore is actually defined by the curved ends of the fingers or pole tips between the slots.

The winding slots 13 may have a re-entrant shape as shown in Figures 2 and 3, or they may be of uniform width as shown at 13' in Figure 6. In any event, the slots, except for their mouth portions 14—14' are filled by stator windings 15—15', the windings being secured in their respective slots by fillers or retaining strips 16—16'.

Where the punched slots of the stator laminations have the re-entrant shape shown in Figures 2 and 3, the filler-retainer strips 16 are retained in place by the abruptly converging side portions 17 of the slots which define the actual mouths of the slots. In the other construction illustrated in Figure 6, the filler-retaining strips 16' are secured in place by being received in notches 18 in the adjacent sides of the slots. In each instance, however, it will be observed that the actual mouth of each slot is narrower than the portion of the slot radially outwardly thereof, and also that the filler-retaining strips 16—16' are spaced radially outwardly of the curved surfaces of the pole tips. Accordingly, the mouth portion of each stator winding slot is unoccupied either by stator windings or winding retaining means, and these spaces are utilized in a manner to be described in the attainment of the objectives of this invention.

Mounted within the bore of the stator is a rotor 18 which like the stator, may consist of a stack of laminations confined between end rings 19, and secured to the shaft 20 of the motor. The bearing or bearings in which the shaft is journalled have not been shown, but it is to be understood that they mount the rotor in true co-axiality with the stator bore.

The rotor may be protected from contact with the liquid or fluid in which the motor operates, but any protection provided therefor forms no part of this invention, and the rotor is therefore illustrated without protection. The stator however, must be suitably protected. Hence, a liquid tight enclosure is provided for the stator, and this enclosure includes an imperforate sleeve 21 lining the stator bore. As explained hereinbefore, it is desirable and preferable that this lining sleeve 21 be made of non-magnetic material of high tensile strength. Stainless steel is particularly well suited as a material for the sleeve, and to minimize electrical losses the sleeve is so thin that it would not without reinforcement sustain the normal pressures under which the motor operates. The sleeve fits snugly into the bore 12 of the stator and as will be appreciated, the rotor may operate with a very close clearance within the sleeve.

The reinforcement of the thin-walled sleeve and its securement to the stator is achieved by this invention in the following manner. The sleeve has a plurality of longitudinally extending attaching members or strips 22 secured to its exterior and projecting radially therefrom, each into one of the winding slots 13—13'. Although the specific form of these strips 22 may be varied, the ribbon-like undulating or corrugated shape therefor shown particularly in Figure 4 is deemed preferable. The strips 22 are narrower than the mouths of the winding slots and are so positioned on the sleeve that when the sleeve is positioned properly in the stator bore, the strips do not touch the sides of the winding slots; but the amplitude of the undulations of the strips substantially corresponds to the radial distance between the exterior surface of the sleeve and the adjacent faces of the retaining strips 16—16'.

The securement of the strips 22 may be effected in any suitable manner as by welding or brazing each undulation thereof to the wall of the sleeve.

Upon insertion of the sleeve with its reinforcing and securing strips 22 fixed thereto into the bore of the stator, the voids left in the mouth portions of the stator winding slots are filled by pouring into them a liquid dielectric cement. When this liquid cement hardens the strips 22 are completely embedded therein and securely locked in the mouth portions of the stator winding slots. The insulative bodies formed by the hardened dielectric cement thus not only lock the lining sleeve to the stator laminations, but also reinforce the portions of the sleeve bridging the stator pole tips to give them the strength needed to sustain the pressures encountered in use of the motor. The normal variations in the punching and stacking of the laminations give the winding slots slightly uneven surfaces which is enough to lock the insulative material or bodies in place longitudinally.

For purposes of illustration, the dielectric cement may be an epoxy or ethoxylene resin or any other resin of the polyvinyl or polyester type; and where the term "hardened electrically insulative material" is used in the claims it is to be understood that it embraces any of these or other suitable materials.

As shown in Figure 1 the lining sleeve 21 extends beyond the ends of the stack of stator laminations far enough to encompass the projecting portions of the stator windings and be anchored in closure discs 23 and these end portions of the sleeve are reinforced by collars 24 telescoped over the sleeve and confined between the discs 23 and the stator laminations. The collars 23 are secured to the cylindrical housing 11 and to the ends of the sleeve 21 with fluid tight connections which may include solder joints 25 and 26.

The motor leads are brought into the stator enclosure by means of a cable 27 which passes through a suitably sealed inlet indicated generally by the numeral 28. The details of this sealed inlet form no part of this invention.

From the foregoing description taken in connection with the accompanying drawing, it will be apparent that this invention provides a simple and effective manner of sealing the stator of a submersible motor from contact with the fluids or liquids in which the motor may be required to operate.

What we claim as our invention is:

1. An electric motor having a rotor and a stator including a stack of laminations with a bore extending axially therethrough and winding slots leading radially from the bore, said slots except for the mouth portions thereof, being filled with the stator windings, characterized by: a fluid tight enclosure for the stator including a thin-walled sleeve between the wall of the bore and the rotor; and means for reinforcing the thin-walled sleeve and for securing it to the stator, comprising attaching members fixed to the exterior of the sleeve and projecting therefrom into the mouths of the winding slots, said attaching members being narrower than the mouths of the winding slots so as to be incapable of bridging the same, and a hardened electrically insulative material filling the voids of the mouth portions of the winding slots and having the attaching members embedded therein.

2. The electric motor of claim 1 further characterized by the fact that said attaching members are strips extending lengthwise of the sleeve.

3. The electric motor of claim 1 wherein the attaching members are metal strips having an undulating curvature viewed edgewise from the side.

4. A sleeve to line the bore of the stator of a sealed electric motor comprising: a thin-walled cylindrical tube; and reinforcing and attaching members on the exterior of the tube arranged in longitudinal rows angularly equispaced about the circumference of the tube, said members being metal strips having an undulating curvature viewed edgewise from the side and fixed to the tube at each undulation.

References Cited in the file of this patent

UNITED STATES PATENTS

| 2,457,740 | Sigmund et al. | Dec. 28, 1948 |
| 2,673,301 | Richter | Mar. 23, 1954 |

FOREIGN PATENTS

| 443,940 | France | May 17, 1912 |